Patented July 25, 1933

1,919,842

UNITED STATES PATENT OFFICE

MARCEL CHARLES JEAN AND PASCAL MATILE, OF MONTEREAU, FRANCE, ASSIGNORS TO SOCIETE L'AIR LIQUIDE, SOCIETE ANONYME POUR L'ETUDE A L'EXPLOITATION, DES PROCEDES GEORGES CLAUDE

PROCESS FOR THE TREATMENT OF GASEOUS MIXTURES CONTAINING HYDROGEN

No Drawing. Application filed March 16, 1928, Serial No. 262,324, and in France March 25, 1927.

This invention relates to the treatment of industrial gaseous mixtures containing hydrogen, chiefly to remove traces of nitrogen oxides which they may contain.

It has been found according to the present invention that on causing the said gaseous mixtures, whether freed or not by the usual industrial methods from the sulphuretted hydrogen which they contain, to pass at the surrounding or slightly higher temperature, that is, at a temperature comprised between 0 and 60° C. over certain reduced metals such as iron and copper which themselves may contain sulphides the nitrogen oxides are practically destroyed. It has also been found that the gaseous mixtures in question treated in that way, no longer generate explosive products on being subsequently exposed to the action of low temperatures for the purpose of separating from them by liquefaction the hydrogen or mixtures rich in hydrogen, whereas explosions sometimes do take place if the precaution of removing the nitrogen oxides is omitted.

*Example.*—Coke-oven gas, deprived of tar, and whether purified by the usual industrial processes or not, is caused to pass either at atmospheric temperature, and at atmospheric pressure or under pressure, over iron which has already been used as catalyzer in the synthetic manufacture of ammonia. The gas which, as has just been stated, contains before its passage over the iron, nitrogen oxides in more or less considerable quantity, and sulphuretted compounds in the state of traces, or more, no longer contains virtually any nitrogen oxides and can be subjected to liquefaction at low temperature without producing dangerous compounds.

The experiments made by the inventors have shown that in the presence of the aforesaid catalyzer, the sulphuretted hydrogen reduces the nitrogen oxides to the state of ammonia, with liberation of sulphur. The ammonia thus generated combines in turn with a part of the sulphur set free and with a fresh quantity of sulphuretted hydrogen to give rise to the formation of polysulphide of ammonia. The equations by which the reactions can be represented are the following:

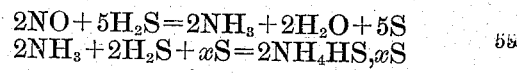
$$2NO + 5H_2S = 2NH_3 + 2H_2O + 5S$$
$$2NH_3 + 2H_2S + xS = 2NH_4HS, xS$$

The aforesaid reactions apply equally to other sulphuretted compounds than sulphuretted hydrogen. Indeed, in the reducing atmosphere which prevails, by reason of the presence of the hydrogen, the various sulphuretted compounds pass, in presence of the catalyzers used, in the state of sulphuretted hydrogen which reacts with the nitric oxide NO of the above-mentioned method.

The present invention has for its object also to provide a method for retaining the activity of the catalyzers in question for a long period of time.

It has been found that for the purpose in question it is sufficient to wash these catalyzers or contact substances with a diluted alkaline or ammonia solution which may contain alkali or ammonia in a free state or combined, for instance in the form of carbonate or sulfohydrate, in order to restore to the substance its original activity which it gradually loses in the course of treatment of the gaseous mixture.

The washing of the catalyzer by alkaline substances such as ammonia or ammoniacal salts of weak acids has the effect of drawing away at the same time the ammonium sulfohydrate which impregnates the catalyzer, and dissolving the excess sulphur which is deposited on it. The reaction according to which dissolution takes place seems to be the following:

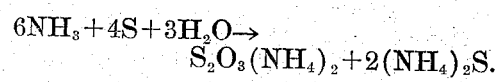
$$6NH_3 + 4S + 3H_2O \rightarrow$$
$$S_2O_3(NH_4)_2 + 2(NH_4)_2S.$$

Finally, the present invention makes it possible to render the regeneration continuous by injecting into the container or containers with the catalyzing substance in question, a small quantity of the alkaline or ammonia solution above referred to, whilst the said container or containers are traversed at the same time by the gas to be purified.

It goes without saying that the process described in the foregoing is not applicable if the contact substance is corroded or attacked by the ammonia solution, as would be the case if this substance were constituted by copper.

We claim as our invention:

1. The process which consists in passing a gaseous mixture containing hydrogen, nitrogen oxides and sulphides over reduced iron at a temperature between 0 and 60° C.

2. The process which consists in freeing a gaseous mixture containing hydrogen, nitrogen oxides and sulphides from its sulphuretted hydrogen by known industrial methods, and thereafter passing said gaseous mixture over reduced iron at a temperature between 0 and 60° C.

3. The process which consists in passing coke-oven gas deprived of tar over reduced iron at atmospheric temperature.

4. The process which consists in passing, under pressure and at atmospheric temperature, coke-oven gas which has previously been purified by known industrial methods over iron which has previously been used as catalyzer for the synthesis of ammonia.

MARCEL CHARLES JEAN.
PASCAL MATILE.